_United States Patent Office_ 2,891,937
Patented June 23, 1959

2,891,937
POLYMERISATION OF UNSATURATED HYDROCARBONS

Hugh Wilma Boulton Reed and Herbert George Lawley, Norton-on-Tees, England, assignors to Imperial Chemical Industries Limited, London, England, a corporation of Great Britain No Drawing. Application April 8, 1957
Serial No. 651,152

Claims priority, application Great Britain
April 23, 1956

11 Claims. (Cl. 260—94.9)

This invention relates to the polymerisation of unsaturated hydrocarbons.

It is known to polymerise aliphatic olefins to solid polymers in the presence of a catalyst comprising chromium oxide on a support consisting of silica, alumina or silica-alumina, the catalyst having been activated by a dry oxygen-containing gas at about 400° to 815° C. so as to leave at least a portion of the chromium in the hexavalent state. The polymerisation process may be carried out in the presence of an inert diluent, preferably a paraffinic hydrocarbon, maintained in the liquid phase. Suggested temperatures of polymerisation are in the range 38° to 205° C. The catalyst may also comprise strontium oxide.

It is also known to polymerise ethylene and/or propylene to solid polymers at 75° to 325° C. in the presence of an alkali metal and a partially reduced oxide of a metal of group 6A of the periodic system which may be supported on a difficultly reducible metal oxide. A liquid hydrocarbon reaction medium preferably an aromatic hydrocarbon, may be used.

We have now found that the yield of solid polymer obtained by polymerising an unsaturated hydrocarbon in the presence of an alkali metal and a partially reduced oxide of a metal of group 6A of the periodic system is dependent on the method by which the alkali metal and the oxide are brought together and that enhanced yields are obtained if the alkali metal is deposited on the oxide from the vapour phase.

We have further found that the effectiveness of a chromium oxide catalyst which has been activated by an oxygen-containing gas, in the polymerisation of unsaturated hydrocarbons is much increased if an alkali metal is deposited from the vapour phase on to the chromium oxide subsequent to the activation treatment. A particularly effective chromium oxide containing catalyst of this type is one that also contains strontium oxide.

According to the invention therefore there is provided a process for the polymerisation of an unsaturated hydrocarbon in which the unsaturated hydrocarbon is brought into contact with a catalyst comprising an oxide of a metal of group VIA of the periodic system and an alkali metal in elementary form, the alkali metal having been deposited on the oxide from the vapour phase under an inert atmosphere.

It is also a feature of the invention to provide a catalyst particularly suitable for the polymerisation of unsaturated hydrocarbons which comprises an oxide of a metal of group VIA of the periodic system and an alkali metal in elementary form the alkali metal having been deposited on the oxide from the vapour phase under an inert atmosphere.

Molybdenum trioxide, chromic oxide and chromium trioxide are group VIA metal oxides which provide very suitable catalysts for use in the process of the invention.

Because of its ready availability coupled with a suitable boiling point it is preferred to use sodium as the alkali metal. The deposition of sodium on the group VIA metal oxide may very conveniently be carried out by heating the sodium to about 425° C. at a pressure of about 0.1 mm. mercury under an atmosphere of nitrogen and passing the vapours over the metal oxide maintained at a lower temperature.

It is preferred that the ratio of alkali metal to group VIA metal oxide is between 0.001 and 10 by weight.

It is also preferred that the catalyst is supported. Suitable supports are, for example, difficultly reducible metal oxides such as gamma-alumina, titania, zirconia, silica and silica plus alumina.

The process of the invention is applicable to the polymerisation of, for example, ethylene and propylene. It is particularly applicable to the production of solid polymers of ethylene.

When the group VIA metal oxide is molybdenum trioxide it is preferred that the oxide is partially reduced before use in the polymerisation process. A variety of reducing agents may be employed for this purpose, for example, hydrogen, carbon monoxide, sulphur dioxide, lithium aluminium hydride. It is preferred to use hydrogen at about atmospheric pressure and at a temperature within the range 350° to 850° C.

When the catalyst comprises chromium oxide it is preferred that the catalyst is activated by a dry oxygen-containing gas as hereinbefore described before use in the polymerisation process and that it also contains strontium oxide, suitably in such an amount as to provide between 0.2 and 4 gram-atoms of strontium per gram-atom of chromium.

The polymerisation process is preferably carried out in the presence of an inert solvent. Suitable inert solvents are aliphatic and aromatic hydrocarbons. An aromatic hydrocarbon solvent is preferred when the catalyst comprises a reduced molybdenum trioxide while an aliphatic hydrocarbon solvent is preferred when the catalyst comprises a chromium oxide activated as hereinbefore described.

The polymerisation process may be carried out over a wide range of temperature and pressure. Very suitable temperatures are within the range 65° C. to 325° C. The pressure may be atmospheric or higher pressure. When an inert solvent is used the pressure should be at least high enough to maintain the solvent in the liquid phase.

Example 1

A powdered molybdena catalyst comprising 15% $MoO_3$ supported on gamma-alumina was contacted with 10 litres/hour hydrogen at 450° C. for 6 hours. The catalyst was then exposed to sodium vapour in a nitrogen atmosphere for 2 hours at 425° C. and 0.1 mm. absolute pressure.

18.3 grams of the catalyst, which now contained 1.9% Na, suspended in 300 ml. xylene were introduced into an autoclave fitted with a stirrer and from which the air was displaced by nitrogen. The suspension was then heated to 190° C., ethylene introduced into the autoclave until the pressure reached 40 ats. gauge and the temperature maintained at 190° C. for 4 hours. After cooling and releasing the pressure 48.8 grams solid polyethylene was obtained.

A similar experiment was carried out using a catalyst comprising 20% $MoO_3$ on gamma-alumina. The hydrogen pre-treatment and polymerisation conditions were the same as in the first experiment. 20 grams of the catalyst were however, mixed with 2 grams solid metallic sodium. Only 29.0 grams of solid polyethylene were obtained thus demonstrating the improvement in yield obtained by depositing the sodium from the vapour phase onto the catalyst.

Example 2

A catalyst comprising 5% $CrO_3$ on silica/alumina was prepared by impregnating a silica/alumina support containing about nine parts silica to one part alumina with an aqueous solution of chromium trioxide, drying and calcining at 450° C.

The catalyst was contacted with dry air at 10 litres/hour for 7 hours at 450° C. and then exposed to sodium vapour in a nitrogen atmosphere for 2 hours at 425° C. and 0.1 mm. absolute pressure.

A solution of ethylene in petroleum ether (boiling range 100° to 120° C.) under a pressure of 35 ats. gauge was passed for 16 hours through 14 grams of the catalyst packed into a reactor tube and heated at 150° C. The space velocity was 7.1 litres of solution per hour per litre of catalyst filled space. 24.5 grams solid polyethylene were obtained compared with the 12.8 grams solid polyethylene obtained in an experiment carried out under identical conditions except that the catalyst was not promoted by sodium.

Example 3

A catalyst comprising 5% $CrO_3$ and 5% SrO on silica/alumina was prepared by impregnating a silica/alumina support with a solution of chromium trioxide as described in Example 2 and then impregnating the dried and calcined catalyst with an aqueous solution of strontium hydroxide, drying and calcining.

The catalyst was treated with dry air, then with sodium vapour and then contacted with a solution of ethylene in petroleum ether as described in Example 2. 37.3 grams solid polyethylene were obtained compared with 27.6 grams obtained in an experiment carried out under identical conditions except that the catalyst contained no sodium.

We claim:

1. A process for the polymerisation of an unsaturated hydrocarbon selected from the group consisting of ethylene and propylene, which comprises bringing said hydrocarbon into contact with a catalyst comprising an oxide of a metal of group VIA of the periodic system and an alkali metal in elementary form, the alkali metal having been deposited on the metal oxide from the vapour phase under an inert atmosphere.

2. A process as claimed in claim 1 in which the oxide of a group VIA metal is supported on a difficultly reducible metal oxide.

3. A process as claimed in claim 2 in which the alkali metal is sodium.

4. A process as claimed in claim 3 whenever carried out in the presence of an inert solvent.

5. A process as claimed in claim 4 in which the group VIA metal oxide is molybdenum trioxide partially reduced by hydrogen at a temperature within the range 350° to 850° C.

6. A process as claimed in claim 5 in which the unsaturated hydrocarbon is ethylene.

7. A process as claimed in claim 4 in which the group VIA metal oxide is a chromium oxide which has been activated by a gas containing free oxygen so as to leave at least a portion of the chromium in the hexavalent state.

8. A process as claimed in claim 7 in which strontium oxide is incorporated with the chromium oxide.

9. A process as claimed in claim 8 in which the unsaturated hydrocarbon is ethylene.

10. A catalyst suitable for use in the polymerisation of unsaturated hydrocarbons which comprises an oxide of a metal of group VIA of the periodic system and an alkali metal in elementary form, the alkali metal having been deposited on the oxide from the vapour phase under an inert atmosphere.

11. A catalyst as claimed in claim 10 which also comprises strontium oxide.

References Cited in the file of this patent

UNITED STATES PATENTS

| | | |
|---|---|---|
| 2,499,255 | Parker | Feb. 28, 1950 |
| 2,691,647 | Field et al. | Oct. 12, 1954 |
| 2,825,721 | Hogan et al. | Mar. 4, 1958 |